United States Patent
Yamasaki et al.

(10) Patent No.: US 8,205,042 B2
(45) Date of Patent: Jun. 19, 2012

(54) COMMUNICATION CONTROL APPARATUS AND METHOD

(75) Inventors: Keisuke Yamasaki, Kawasaki (JP); Katsuya Niigata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 12/622,896

(22) Filed: Nov. 20, 2009

(65) Prior Publication Data

US 2010/0169574 A1    Jul. 1, 2010

(30) Foreign Application Priority Data

Dec. 25, 2008    (JP) .................................. 2008-331425

(51) Int. Cl.
*G06F 12/00*    (2006.01)

(52) U.S. Cl. ...................................... 711/114

(58) Field of Classification Search .................. None
See application file for complete search history.

(56) References Cited

U.S. PATENT DOCUMENTS

| 7,916,737 B2* | 3/2011 | Akahane ...................... 370/400 |
| 2005/0228943 A1* | 10/2005 | DeCenzo et al. ............. 711/114 |

FOREIGN PATENT DOCUMENTS

| JP | 2004-326244 | 11/2004 |
| JP | 2007-141047 | 6/2007 |

* cited by examiner

*Primary Examiner* — Hiep Nguyen
(74) *Attorney, Agent, or Firm* — Staas & Halsey LLP

(57) ABSTRACT

A communication control apparatus in a RAID device including redundant communication paths to storage devices includes a blocking unit. The blocking unit blocks configuration change notifications outputted from the storage devices to a control apparatus, which controls access to the storage devices, when a power of a communication relay device arranged on the redundant paths connecting the storage devices and the control apparatus is turned off.

20 Claims, 14 Drawing Sheets

FIG. 3

| STORAGE DEVICE | S-ID | WWN | FC SUPPORT LEVEL | POWER | ..... |
|---|---|---|---|---|---|
| STORAGE DEVICE 1 | 0101EF | xxxxxxxx | CLASS 3 | ON | ..... |
| STORAGE DEVICE 2 | 0102EF | yyyyyyyy | CLASS 3 | ON | ..... |
| STORAGE DEVICE 3 | 0103GH | zzzzzzzz | CLASS 2 | ON | ..... |
| STORAGE DEVICE 4 | 0104KL | vvvvvvvv | CLASS 1 | ON | ..... |
| ..... | ..... | ..... | ..... | | ..... |
| STORAGE DEVICE n | ..... | ..... | ..... | | ..... |

| STORAGE DEVICE | S-ID | WWN | FC SUPPORT LEVEL | POWER | ..... |
|---|---|---|---|---|---|
| STORAGE DEVICE 1 | 0101EF | xxxxxxxx | CLASS 3 | ON | ..... |
| STORAGE DEVICE 2 | 0102EF | yyyyyyyy | CLASS 3 | ON | ..... |
| STORAGE DEVICE 3 | 0103GH | zzzzzzzz | CLASS 2 | OFF | ..... |
| STORAGE DEVICE 4 | 0104KL | vvvvvvvv | CLASS 1 | OFF | ..... |
| ..... | ..... | ..... | ..... | | ..... |
| STORAGE DEVICE n | ..... | ..... | ..... | ON | ..... |
| STORAGE DEVICE b | 0205KL | aaaaaaaa | CLASS 2 | ON | ..... |

212a

COMMUNICATION CONTROL APPARATUS AND METHOD

CROSS-REFERENCE TO RELATED APPLICATIONS

This application is based upon and claims the benefit of priority of the prior Japanese Patent Application No. 2008-331425, filed on Dec. 25, 2008, the entire contents of which are incorporated herein by reference.

BACKGROUND

1. Field

The embodiment(s) herein relate to a communication control apparatus and method thereof.

2. Description of the Related Art

A RAID device (Redundant Arrays of Inexpensive Disks) includes a plurality of communication paths even for the same HDD so that reading/writing of data, etc., to and from the HDD can be maintained even if a failure occurs in the device. This will be specifically described with reference to FIG. 14. FIG. 14 is a diagram for explaining a RAID device.

As illustrated in FIG. 14, there are a plurality of route switches and switches between a controller and HDD in a RAID device 10. The route switches and the switches establish a plurality of communication paths for communications between the controller and the HDD.

The communication paths include predetermined communication paths (main system: solid lines of FIG. 14) used in normal operation and auxiliary communication paths (redundant system: dotted lines of FIG. 14) serving as a backup for continuing reading/writing of data to and from the HDD when a failure occurs in the main system.

Therefore, even if a failure occurs in the main system of the RAID device 10, switching the communication paths from the main system to the redundant system based on an instruction from the controller allows continuation of data reading/writing, etc., to and from the HDD in the RAID device 10, and the operation of the RAID device 10 can be maintained.

However, when there is no failure, only the main system is used, and the redundant system is not used in some cases. In that case, the power of the switches and the HDD of the redundant system are on, and there is unnecessary power consumption in the redundant system.

Thus, to reduce the power consumption of the redundant system, there is a technique for turning on the power when the HDD of the redundant system is used and a technique for turning on/off the power of the switches of the redundant system according to the access frequency to the HDD. Referenced documents are Japanese Laid-Open Patent Publication No. 2004-326244 and 2007-141047.

SUMMARY

According to an aspect of the invention, a communication control apparatus and method thereof are provided. The communication control apparatus in a RAID device includes redundant communication paths to storage devices includes a blocking unit. The blocking unit blocks configuration change notifications outputted from the storage devices to a control apparatus, which controls access to the storage devices, when a power of a communication relay device arranged on the redundant paths connecting the storage devices and the control apparatus is turned off.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a diagram illustrating an example of a network information table;

FIG. 5 is a diagram illustrating an example of a network information table after an update;

DETAILED DESCRIPTION OF EMBODIMENTS

Figure 1:
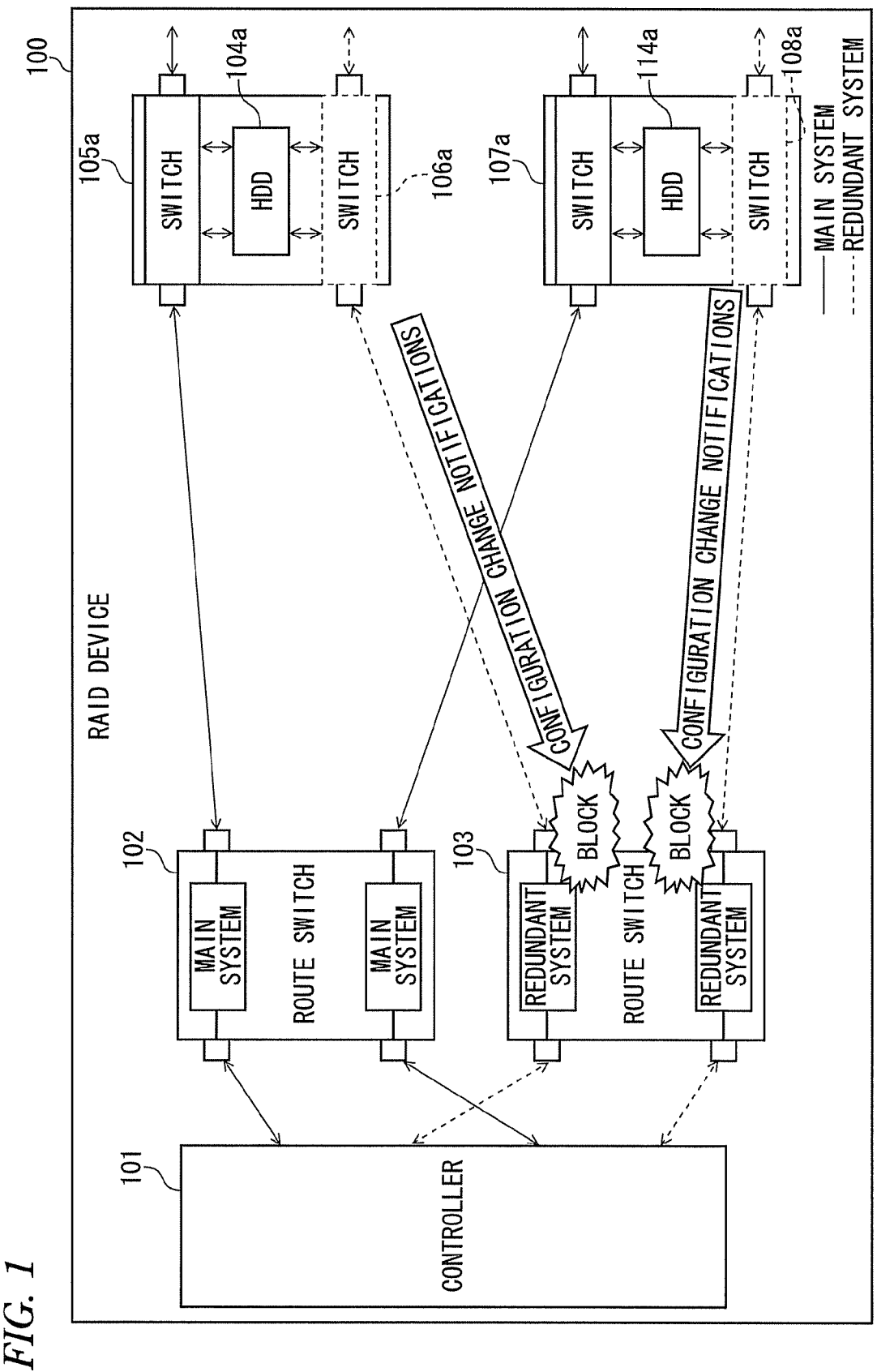
FIG. 1 is a diagram for explaining a summary of a technique.

Reference will now be made in detail to the embodiments, examples of which are illustrated in the accompanying drawings, wherein like reference numerals refer to the like elements throughout. The embodiments are described below to explain the present invention by referring to the figures.

A preferred embodiment of a communication control apparatus according to an embodiment will now be described in detail with reference to the appended drawings. In an embodiment, a route switch will be described as an example of a communication control apparatus.

Main terms used in an embodiment will be described first. A "RAID (Redundant Arrays of Inexpensive Disks) device" is a device that comprehensively manages a plurality of storage devices (HDD (Hard Disk Drive)), and measures are taken to deal with fast data processing and prevent data loss.

In an embodiment, a system, in which a single RAID device described above serves as a storage system, including an upper apparatus (host, etc.) that requests the storage system (single RAID device) to record data, etc., will be referred to as an "information system".

"Configuration change notification" data denotes network communication signals sent out from HDD when configuration(s) of the HDD in the RAID device are changed. For example, configuration change notifications are generated when switches or HDD arranged on various communication paths in the RAID device are turned on/off, or when an HDD is added or removed. While a few examples causing a change notification are discussed herein, the present invention is not limited thereto.

Specifically, examples of a communication procedure for the configuration change notifications include "LIP (Loop Initialization Protocol)" and "broadcast". The configuration change notification data may further include information corresponding to power ON/OFF of the switches and HDD.

A "main system" denotes communication paths usually used in communications between a controller and the HDD in the RAID device. A "redundant system" denotes auxiliary communication paths serving as a backup. The use of the communication paths of the redundant system allows the continuation of data communications, such as reading/writing of data to and from the HDD, even if a communication failure occurs in the main system.

"ON" denotes that the power of switches arranged on the communication paths of the main system or the redundant system is on, and "OFF" denotes that the power of switches arranged on the communication paths of the main system or the redundant system is off, unless otherwise stated.

When the power of the redundant system is turned on or off, the HDD connected to the switches arranged on the communication paths of the redundant system generate the configuration change notifications, and power ON/OFF commands are transferred to the controller.

A summary of the technique according to an embodiment will be described. A route switch of the redundant system according to an embodiment blocks the configuration change notification data generated from the HDD to prevent the data from being transferred to the controller after the power of the switches arranged in the redundant system is turned off.

FIG. 1 is a diagram for explaining a summary of a technique according to an embodiment. In FIG. 1, there are switches 105a to 108a between a controller 101 and HDD 104a and 114a in the RAID device 100, and the RAID device 100 includes a plurality of communication paths (main system: solid lines, redundant system: dotted lines) for communications between the controller 101 and a plurality of HDD (such as the HDD 104a and 114a). The RAID device 100 also includes a route switch 102 that manages the communication paths of the main system and a route switch 103 that manages the communication paths of the redundant system.

If the power of switches 106a and 108a under the control of the route switch 103 is turned off, for example, to reduce power consumption of the redundant system, the HDD 104a, 114a, etc., generate configuration change notifications as the power of the redundant system is turned off.

The route switch 103 blocks the configuration change notifications to prevent the controller 101 from recognizing the configuration change notifications.

As the route switch 103 blocks the configuration change notifications generated after the power of the redundant system is turned off, the controller 101 does not have to recognize the configuration change notifications generated as the power of the redundant system is turned off.

As a result, unnecessary power consumption in the redundant system can be reduced without increasing the processing resources of the controller 101.

Figure 2:
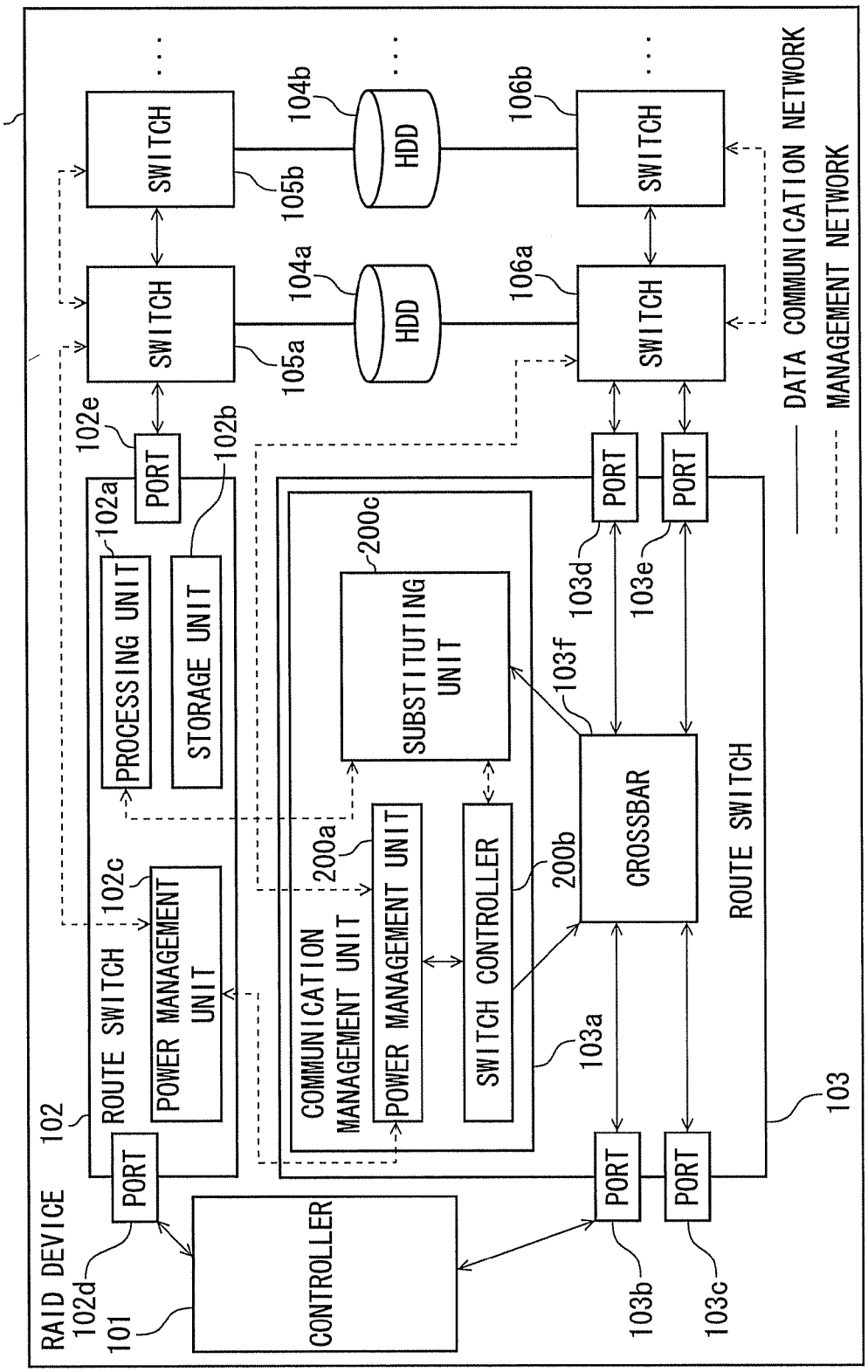
FIG. 2 is a functional block diagram of a configuration of a RAID device according to an embodiment.

The configuration of the RAID device 100 will now be described. FIG. 2 is a functional block diagram of a configuration of the RAID device according to an embodiment. As illustrated in FIG. 2, the RAID device 100 includes the controller 101, the route switches 102 and 103, a plurality of storage devices (for example, HDD 104a, 104b, ... ) and a plurality of switches (for example, switches 105a, 105b, 106a, and 106b).

The RAID device 100 includes a data communication network (solid lines of FIG. 2) and a management network (dotted lines of FIG. 2) as networks for data communications between various devices and power management.

The data communication network transmits and receives the configuration change notification data as well as various data and commands stored in the HDD. The commands include a read/write command for controlling reading/writing to and from the HDD and a login command used for connecting the HDD with the data communication network.

In the management network, data indicating power ON/OFF commands, failure detection notifications, expansion change notifications, etc., is exchanged. The power ON/OFF command denotes a command for turning on and off the power of the switches. If a power ON/OFF command is inputted, the route switches transfer the power ON/OFF command to the switches under the control.

As the power ON/OFF command is transmitted to the switches, the power of the switches can be turned on or off, and the power of the HDD under the control can also be turned on or off as necessary.

The "failure detection notification" data is information indicating that there is a communication failure in the main system. When a switch of the main system detects a failure detection notification, the failure detection notification is transferred to the route switch 102. The "expansion change notification" data is information indicating that an HDD is newly added to the RAID device 100. In the same way as for the failure detection notification, when a switch of the main system detects an expansion change notification, the expansion change notification is transferred to the route switch 102.

The controller 101 executes a process of switching the main system or the redundant system, executes an initialization process associated with the activation of the RAID device 100, and issues a read/write command, a login command, etc., through the data communication network during the operation of the RAID device 100.

The initialization process is a process for the controller 101 to acquire, upon the activation of the RAID device 100, information of the HDD (for example, HDD 104a and 104b) through the data communication network to create a network information table.

After the initialization process, the controller 101 transfers the network information table to the route switch 103. The route switch 103 then acquires the network information table and stores or updates the acquired network information table.

FIG. 3 is a diagram illustrating an example of a network information table. A network information table 202a illustrated in FIG. 3 stores "STORAGE DEVICE", "S-ID (Source-IDentification)", "WWN (World Wide Name)", "FC (Fibre Channel) SUPPORT LEVEL", and "POWER".

"STORAGE DEVICE" indicates information for identifying the HDD in the RAID device 100. The identification information such as numbers identify the HDD in the RAID device 100, such as storage device 1 and storage device 2.

"S-ID" indicates dynamic address information of the HDD in the RAID device 100, and "S-ID" is updated when a connection mode or the storage system of the HDD is changed. Therefore, although the S-ID of the storage device 1 is "0101 EF", the S-ID may be updated according to a change in the connection mode of the HDD. The same applies to "0102EF" of the storage device 2 and "0103 GH" of a storage device 3.

"WWN" denotes fixed identification numbers included in the HDD and denotes identification information provided when the HDD are produced. Therefore, WWN is not updated according to a change in the connection mode or the storage system of the HDD, and the same information is always set.

Therefore, WWN of the storage device 1 is "xxxxxxxx", and WWN of the storage device 1 remains "xxxxxxxx" even if the connection mode, etc., of the HDD is changed. The same applies to the storage device 2 and the subsequent devices.

"FC SUPPORT LEVEL" denotes information defining the reliability of communication, etc., between devices in the RAID device 100, and a class 1, a class 2, and a class 3 are mainly set. In general, the class 1 defines communications with higher reliability, and as the reliability decreases, the class 2 and the class 3 are set.

For example, "CLASS 3" is set for the FC support level of the storage devices 1 and 2, and data communications defined by the class 3 are supported. Meanwhile, "CLASS 2" and "CLASS 1" are set for the FC support level of the storage devices 3 and 4, respectively, and communications defined by the classes 2 and 1 are supported in the storage devices 3 and 4, respectively.

Therefore, the storage device 4 supports communications with higher reliability, and the reliability of the communications supported by the storage devices 1 and 2 is lower than the communications supported by the storage device 4.

"POWER" denotes power status of the HDD, and ON or OFF is set. Therefore, the power of the storage device is on when "ON" is set to the storage device, and the power of the storage device is off when "OFF" is set to the storage device.

The status of ON/OFF set to POWER indicates the power status of the switches arranged in the redundant system connected to the HDD. For example, if POWER of the storage device 1 is "ON", the power of the switches of the redundant system connected to the storage device 1 is on. If the POWER of the storage device 1 is "OFF", the power of the switches of the redundant system connected to the storage device 1 is off.

The initialization process also includes a process executed by the controller 101 to store information in the route switches, the information identifying whether the route switches are used in the main system or the redundant system. In an embodiment, the route switch 102 is a route switch used in the main system, and the route switch 103 is a route switch used in the redundant system.

The route switches 102 and 103 will be described with reference again to FIG. 2. The route switch 102 is a route switch used in the main system and transfers various commands issued by the controller 101, data stored in the HDD, etc., through the data communication network.

Through the management network, the route switch 102 also manages the power of the switches (for example, switch 105a) under the control and transfers failure detection notifications and expansion change notifications.

The route switch 102 includes a processing unit 102a, a storage unit 102b, a power management unit 102c, and ports 102d and 102e.

The processing unit 102a transfers read/write commands issued by the controller 101, various data stored in the HDD, and failure detection notifications/expansion change notifications.

For example, if the processing unit 102a receives a read/write command or various data stored in the HDD from the controller 101, the processing unit 102a transfers the received data to the port 102e.

If the processing unit 102a receives a failure detection notification or an expansion change notification from the switches 105a, 105b, etc., the processing unit 102a transfers the received failure detection notification or expansion change notification to the route switch 103.

The storage unit 102b stores information for identifying that the route switch 102 is a route switch used in the main system during the initialization process.

The power management unit 102c issues a power ON/OFF command of the switches used in the main system and transfers the command to the switch 105a. For example, if the RAID device 100 is activated, the power management unit 102c issues a power ON command of the switches used in the main system and transfers the command to the switch 105a through the management network.

The port 102d is an interface for transmitting and receiving data to and from the controller 101, and the port 102e is an interface for transmitting and receiving data to and from the switch 105a.

The route switch 103 is a route switch used in the redundant system. The route switch 103 controls the switches and the HDD used in the redundant system, connects to other devices, and includes a communication management unit 103a, ports 103b to 103e and a crossbar 103f.

The communication management unit 103a executes communication processes, such as processing of the configuration change notifications and substituting for the controller 101, manages the power of the switches of the redundant system, and includes a power management unit 200a, a switch controller 200b, and a substituting unit 200c.

The power management unit 200a transfers a power ON/OFF command of the switches used in the redundant system to the switch 106a through the management network. An ON/OFF command issuing unit 201d described below issues the power ON/OFF command.

For example, if the substituting unit 200c issues a power ON/OFF command of the switches of the redundant system, the power management unit 200a transfers the issued power ON/OFF command to the switch 106a through the management network.

The switch controller 200b transfers response frames and power ON/OFF commands transferred from the substituting unit 200c.

For example, if the substituting unit 200c creates a response frame, the switch controller 200b transfers the response frame to the controller 101 through the crossbar 103f. The response frame denotes response information for a command other than the read/write command issued by the controller 101.

Meanwhile, if the substituting unit 200c issues a power ON/OFF command, the switch controller 200b transfers the power ON/OFF command to the power management unit 200a.

The substituting unit 200c blocks the configuration change notification issued by the HDD 104a, 104b, etc., processes the command issued by the controller 101, updates the network information table, and controls communications with other devices such as the route switches 102 and 103.

Figure 4:
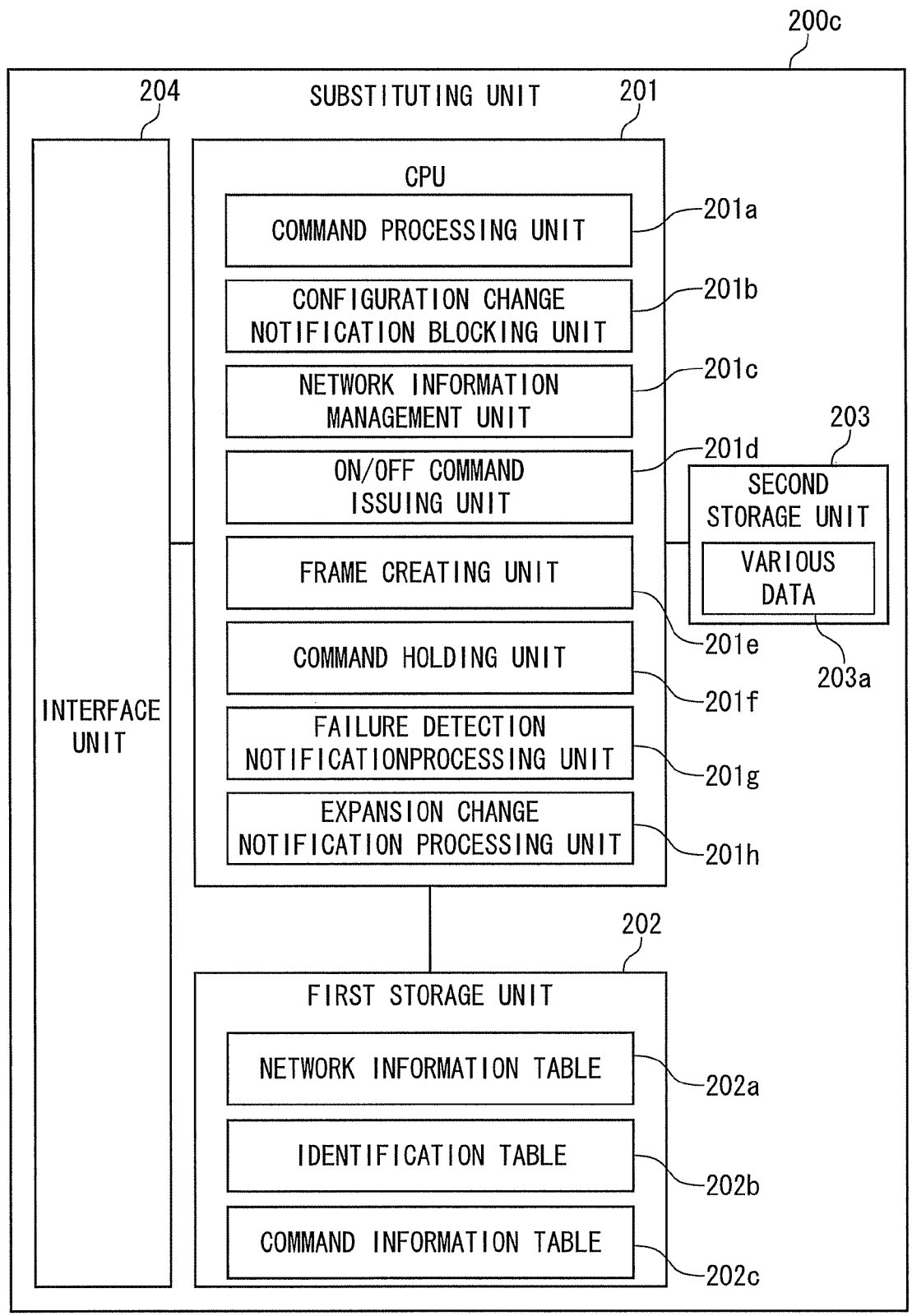
FIG. 4 is a functional block diagram of a configuration of a substituting unit.

FIG. 4 is a functional block diagram of a configuration of the substituting unit 200c. With reference to FIG. 4, the substituting unit 200c includes a CPU (Central Processing Unit) 201, a first storage unit 202, a second storage unit 203, and an interface unit 204.

The CPU 201 executes a control process between the controller 101 and the switch 106a illustrated in FIG. 2, analyzes various commands issued from the controller 101, blocks the configuration change notifications, updates the network information table, and issues a power ON/OFF command.

The CPU 201 includes a command processing unit 201*a*, a configuration change notification blocking unit 201*b*, a network information management unit 201*c*, the ON/OFF command issuing unit 201*d*, a frame creating unit 201*e*, a command holding unit 201*f*, a failure detection notification processing unit 201*g*, and an expansion change notification processing unit 201*h*.

The command processing unit 201*a* determines whether the various commands issued from the controller 101 to the HDD 104*a*, 104*b*, etc., are read/write commands.

The configuration change notification blocking unit 201*b* blocks the configuration change notifications generated from the HDD if the power of the switches (for example, switches 106*a* and 106*b*) of the redundant system is turned off.

Specifically, if the substituting unit 200*c* receives configuration change notifications, the configuration change notification blocking unit 201*b* refers to the network information table 202*a* (see FIG. 3) and blocks the configuration change notifications if the configuration change notifications are from the various storage devices stored in the network information table 202*a*.

This is because the configurations of the various storage devices stored in the network information table 202*a* are already notified to the controller 101, and there is no need to notify the configuration change notifications to the controller 101 again.

The "blocking" includes an act of discarding a network communication signal indicated by a transmitted configuration change notification.

A specific process executed by the configuration change notification blocking unit 201*b* will now be described. If a communication failure or a request for processing a read/write command is not generated in the main system within a predetermined time after the activation of the RAID device 100, the ON/OFF command issuing unit 201*d* described below issues a power OFF command. As a result, the power of the switches of the redundant system is turned off.

When the power of the switches of the redundant system is turned off, the HDD 104*a* and 104*b* generate configuration change notifications as described above, and the notifications are transferred from the switches of the redundant system to the route switch 103 through the data communication network.

The configuration change notification blocking unit 201*b* then blocks the configuration change notifications received from the interface unit 204. As a result, the controller 101 does not process the configuration change notifications.

A specific process executed after the configuration change notification blocking unit 201*b* blocked the configuration change notifications generated after the activation of the RAID device 100 will now be described.

If the command processing unit 201*a* analyzes that a read/write command is issued, the route switch 103 needs to respond to the read/write command. However, since the power of the switches of the redundant system is off as described above, the route switch 103 does not have information of the HDD and cannot respond to the read/write command.

Therefore, the switches of the redundant system need to be reactivated, and the route switch 103 turns on the power of the switches of the redundant system. Consequently, the HDD 104*a* and 104*b* generate configuration change notifications as the power of the switches of the redundant system is turned on.

The configuration change notification blocking unit 201*b* then blocks the configuration change notifications generated as the power of the switches of the redundant system is turned on and prevent the notifications from being transferred to the controller 101.

A case in which a communication failure occurs in the main system will be described. When a communication failure occurs in the main system, the main system cannot be used. Therefore, the communication paths need to be switched from the main system to the redundant system. Thus, the switches of the redundant system need to be reactivated.

The HDD 104*a* and 104*b* generate configuration change notifications as the power of the switches of the redundant system is turned on, and the configuration change notification blocking unit 201*b* blocks the configuration change notifications generated as the power of the switches of the redundant system is turned on and prevents the notifications from being transferred to the controller 101.

If an HDD is newly installed on the RAID device 100, information of the additionally installed HDD also needs to be reflected on the controller 101. This is because the controller 101 cannot switch the communication paths from the main system to the redundant system if the controller 101 and the route switch 103 do not include the information of the new installation of the HDD.

However, the information of the additionally installed HDD cannot be recognized if the power of the redundant system remains off, and the switches of the redundant system need to be reactivated.

Therefore, if an HDD is newly installed on the RAID device 100, information of the HDD, such as a storage device b, is added to the network information table 202*a* in addition to the storage devices 1 to n included in the network information table 202*a* illustrated in FIG. 3 (see FIG. 5 described below for the network information table 202*a* after update).

Since the state of the switches of the redundant system changes from OFF to ON, the HDD 104*a* and 104*b* generate configuration change notifications as the power of the switches of the redundant system is turned on. The configuration change notification blocking unit 201*b* blocks, on an as needed basis, the configuration change notifications generated as the power of the switches of the redundant system is turned on and prevents the notifications from being transferred to the controller 101.

In this way, the configuration change notification blocking unit 201*b* blocks the configuration change notifications generated when a read/write command is issued, a communication failure occurs, or an HDD is newly installed after the power of the switches of the redundant system is turned off.

The network information management unit 201*c* acquires the network information table 202*a* illustrated in FIG. 3 from the interface unit 204, stores the acquired information in the first storage unit 202, and updates and manages the stored network information table 202*a*.

For example, after the initialization process, the network information management unit 201*c* updates "ON" set in "POWER" to "OFF" when recognizing that the item equivalent to "POWER" is OFF in the received configuration change notification.

This will be specifically described with reference to the drawings. FIG. 5 is a diagram illustrating an example of a network information table after an update according to an embodiment. FIG. 5 illustrates an example of a network information table after the network information table 202*a* illustrated in FIG. 3 is updated by the network information management unit 201*c*.

As illustrated in FIG. 5, OFF is set to "POWER" of the storage devices 3 and 4. On the other hand, "ON" is set to "POWER" of the storage devices 3 and 4 of the network information table 202a before an update. Therefore, FIG. 5 illustrates that the network information management unit 201c has recognized that the power of the storage devices 3 and 4 is off based on the received configuration change notifications and that the power is updated from ON to OFF.

If a new HDD (for example, storage device b) is added, information of the storage device b is added in addition to the storage devices 1 to n stored upon the initialization process (dotted lines of FIG. 5).

The ON/OFF command issuing unit 201d will be described with reference again to FIG. 4. The ON/OFF command issuing unit 201d outputs a power ON command or a power OFF command of the switches of the redundant system to the interface unit 204 through the management network.

For example, if there is no communication failure in the main system immediately after the activation of the RAID device 100, the ON/OFF command issuing unit 201d issues a power OFF command for turning off the power of the switches of the redundant system after a predetermined time from the activation.

The ON/OFF command issuing unit 201d issues a power ON command for turning on the power of the switches of the redundant system when the controller 101 issues a read/write command, a communication failure occurs in the main system, or an HDD is additionally installed.

If the command processing unit 201a analyzes that a command other than the read/write command is issued, the frame creating unit 201e creates a response frame for the controller 101 and outputs the created response frame to the interface unit 204. The response frame denotes response information for a command other than the read/write command issued by the controller 101.

The command holding unit 201f holds a read/write command issued by the controller 101. Specifically, the command holding unit 201f holds the read/write command issued by the controller 101 until the power of the switches of the redundant system is turned on.

After confirming that the power of the redundant system is turned on (for example, a predetermined time after the ON/OFF command issuing unit 201d issued a power ON command), the ON/OFF command issuing unit 201d outputs the read/write command to the interface unit 204.

The failure detection notification processing unit 201g acquires a failure detection notification from the interface unit 204 and orders the ON/OFF command issuing unit 201d to issue a power ON command.

The expansion change notification processing unit 201h acquires an expansion change notification from the interface unit 204 and orders the ON/OFF command issuing unit 201d to issue a power ON command.

The first storage unit 202 stores identification information of the HDD in the RAID device 100, identification information indicating whether the route switches are the main system or the redundant system, and command information. The first storage unit 202 includes the network information table 202a, an identification table 202b, and a command information table 202c.

The network information table 202a is equivalent to the network information table 202a illustrated in FIG. 3, and the network information management unit 201c executes an updating process, etc., of the stored information.

The identification table 202b is a table indicating that the route switch 103 is a route switch used in the redundant system. The command information table 202c indicates command information issued to the HDD by the controller 101 and indicates a table that can identify a read/write command or other commands (for example, login command). The command processing unit 201a refers to the command information table 202c.

The second storage unit 203 temporarily stores various data used in the CPU 201 and includes various data 203a. Therefore, the various data 203a temporarily stores data stored in the network information table 202a, the identification table 202b, and the command information table 202c.

The first and second storage units may be RAM (Random Access Memory) or other storage units. The first and second storage units do not have to be configured as illustrated, and all or part of the first and second storage units can be functionally or physically dispersed and integrated in arbitrary combinations according to various loads and usages.

The interface unit 204 is an interface for transmission and reception between the switch controller 200b (see FIG. 2) and the CPU 201 in the management network. The interface unit 204 is an interface for transmission and reception between the crossbar 103f (see FIG. 2) and the CPU 201 in the data communication network.

The crossbar 103f will be described with reference again to FIG. 2. The crossbar 103f is a path processing unit that determines ports that the controller 101 and the switch 106a will be connected.

In an embodiment, the controller 101 is connected to the port 103b, and the switch 106a is connected to the port 103d for convenience. The controller 101 or the switch 106a may be connected to other ports (for example, the ports 103c and 103e).

The ports 103b and 103c are interfaces for transmitting and receiving data to and from the controller 101 and the crossbar 103f, and the ports 103d and 103e are interfaces for transmitting and receiving data to and from the crossbar 103f, the switches, etc.

HDD, such as HDD 104a, 104b, . . . , are units that store various data and programs used in the information system. A plurality of HDD, such as HDD 104a and 104b, is included.

The switches 105a and 105b are switches used in the main system and execute communication processes of various commands transferred from the route switch 102 and various data stored in the HDD.

For example, if the switch 105a receives various commands to the HDD 104a or various stored data from the route switch 102, the switch 105a outputs the received commands and various data to the HDD 104a.

If the switches 105a and 105b receive a power ON/OFF command of the switches 105a and 105b through the management network, the switches 105a and 105b turn on/off the power of the switches 105a and 105b.

On the other hand, if the switches 105a and 105b receive a power ON/OFF command of devices other than the switches 105a and 105b, the switches 105a and 105b transfer the transferred power ON/OFF command to other switches.

For example, if the switch 105a receives a power ON/OFF command to the switch 105a through the management network, the switch 105a turns on/off the power of the switch 105a.

On the other hand, if the switch 105a receives a power ON/OFF command of the switch 105b through the management network, the switch 105a transfers the power ON/OFF command to the switch 105b.

The switches 106a and 106b are switches used in the redundant system and control communications of various commands transferred from the route switch 103 and various data stored in the HDD. The switches 106a and 106b are used when a communication failure, etc., occurs in the main system.

Therefore, if a communication failure, etc., occurs in the main system and the communication paths in the RAID device 100 are switched from the main system to the redundant system, the switch 106a receives various commands from the route switch 103 to the HDD 104a or various stored data through the data communication network and outputs the received commands and various data to the HDD 104a.

If the switches 106a and 106b receive a power ON/OFF command of the switches 106a and switch 106b through the management network, the switches 106a and 106b turn on/off the power of the switches 106a and 106b. As the switches 106a and 106b turn on/off the power, the switches 106a and 106b also turn on/off the power of the HDD under the control as necessary.

On the other hand, if the switches 106a and 106b receive a power ON/OFF command of devices other than the switches 106a and 106b, the switches 106a and 106b transfer the transferred power ON/OFF command to other switches.

For example, if the switch 106a receives a power ON/OFF command of the switch 106a from the route switch 103 through the management network, the switch 106a turns on/off the power of the switch 106a.

On the other hand, if the route switch 103 transfers a power ON/OFF command of the switch 106b to the switch 106a through the management network, the switch 106a transfers the power ON/OFF command to the switch 106b.

A process of the configuration change notification blocking unit 201b blocking the configuration change notifications generated after the activation of the RAID device 100 will be described with reference to FIGS. 2 to 4.

When the RAID device 100 is turned on, the route switches 102 and 103 transmit a power ON command through the management network. The switches of the main system and the redundant system are then turned on.

After confirming that the power of the main system and the redundant system is turned on, the controller 101 illustrated in FIG. 2 initializes the data communication network. The main system and the redundant system can be used once the initialization of the main system and the redundant system is completed.

During the initialization, identification information indicative of the route switch of the main system is stored in the storage unit 102b (see FIG. 2), and identification information indicative of the route switch of the redundant system is stored in the first storage unit 202 (see FIG. 4).

The controller 101 acquires information of the HDD (for example, HDD 104a and 104b) through the data communication network during the initialization and creates the network information table 202a (see FIG. 3).

The network information management unit 201c illustrated in FIG. 4 acquires the created network information table 202a and stores the acquired network information table 202a in the storage unit 202.

If there is no communication failure in the main system, the ON/OFF command issuing unit 201d illustrated in FIG. 4 issues a power OFF command of the switches of the redundant system (for example, switches 106a and 106b: see FIG. 2) through the management network.

When the power of the switches of the redundant system is turned off, the HDD 104a and 104b illustrated in FIG. 2 generate configuration change notifications. The generated configuration changes are transferred from the switches of the redundant system to the route switch 103 through the data communication network.

The configuration change notification blocking unit 201b illustrated in FIG. 4 then blocks the configuration change notifications acquired from the interface unit 204 to prevent the configuration change notifications from being transferred to the controller 101.

After the configuration change notification blocking unit 201b blocks the configuration change notifications, the network information management unit 201c updates the network information table 202a based on the received configuration change notifications.

After the network information management unit 201c updates the network information table 202a, the route switch 103 starts monitoring the RAID device 100. Four examples of events generated afterwards will be listed and described below with reference to the drawings.

Figure 6:
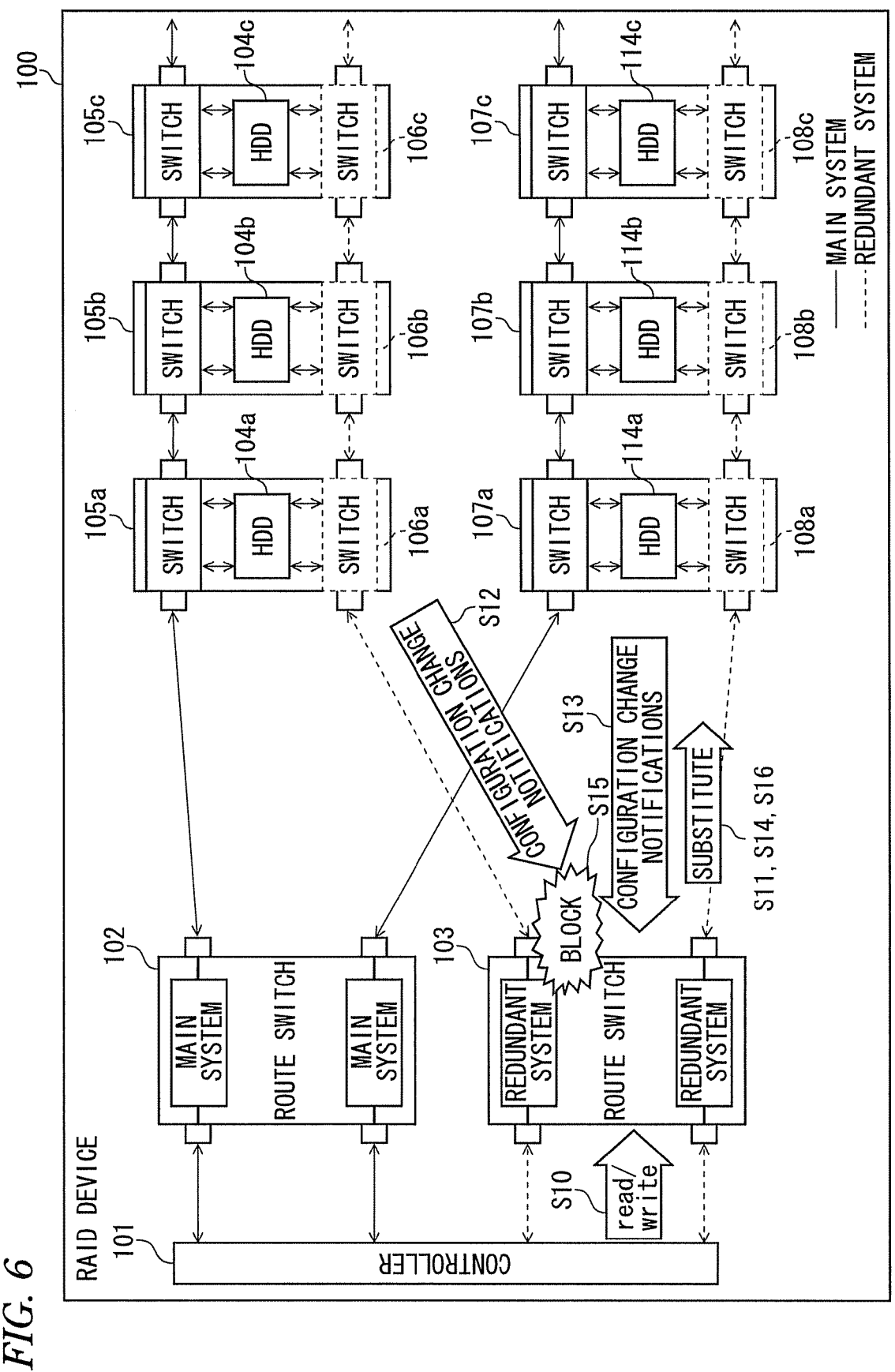
FIG. 6 is a diagram for explaining a process when a read/write command is issued.

A process executed by the route switch 103 when the controller 101 illustrated in FIG. 2 issues a read/write command will be described with reference to FIG. 6 and FIGS. 2 to 4. FIG. 6 is a diagram for explaining a process when a read/write command is issued.

As illustrated in FIG. 6, if the command processing unit 201a (see FIG. 4) analyzes that a command issued from the controller 101 to the route switch 103 is a read/write command (operation S10), the ON/OFF command issuing unit 201d (see FIG. 4) issues a power ON command of the switches 106a to 106c of the redundant system and the switches 108a to 108c of the redundant system through the management network (operation S11).

After the power of the switches 106a to 106c of the redundant system and the switches 108a to 108c of the redundant system is turned on, the HDD 104a to 104c and the HDD 114a to 114c generate configuration change notifications generated as the power of the redundant system is turned on (operations S12 and S13).

The network information management unit 201c illustrated in FIG. 4 then acquires the configuration change notifications from the interface unit 204 and updates the network information table 202a (see FIG. 3) based on the acquired configuration change notifications (operation S14).

After the update, the configuration change notification blocking unit 201b (see FIG. 4) blocks the configuration change notifications to prevent the controller 101 from processing the generated configuration change notifications (operation S15).

A predetermined time after the ON/OFF command issuing unit 201d issued the power ON command, the command holding unit 201f illustrated in FIG. 4 transmits the read/write command issued by the controller 101 to the HDD 104a to 104c and the HDD 114a to 114c (operation S16).

A predetermined time after the command holding unit 201f transmitted the read/write command, the ON/OFF command issuing unit 201d outputs the power OFF command of the switches of the redundant system to the interface unit 204 (see FIG. 2).

In that case, the configuration change notification blocking unit 201b also blocks the configuration change notifications generated as the power of the switches of the redundant system is turned off.

In this way, when the controller 101 issues a read/write command, the route switch 103 turns on the power of the switches of the redundant system to process the read/write command. Even if the power of the switches of the redundant system is turned on, the controller 101 does not have to process the generated configuration change notifications, because the configuration change notifications associated with the power-on are blocked.

Figure 7:
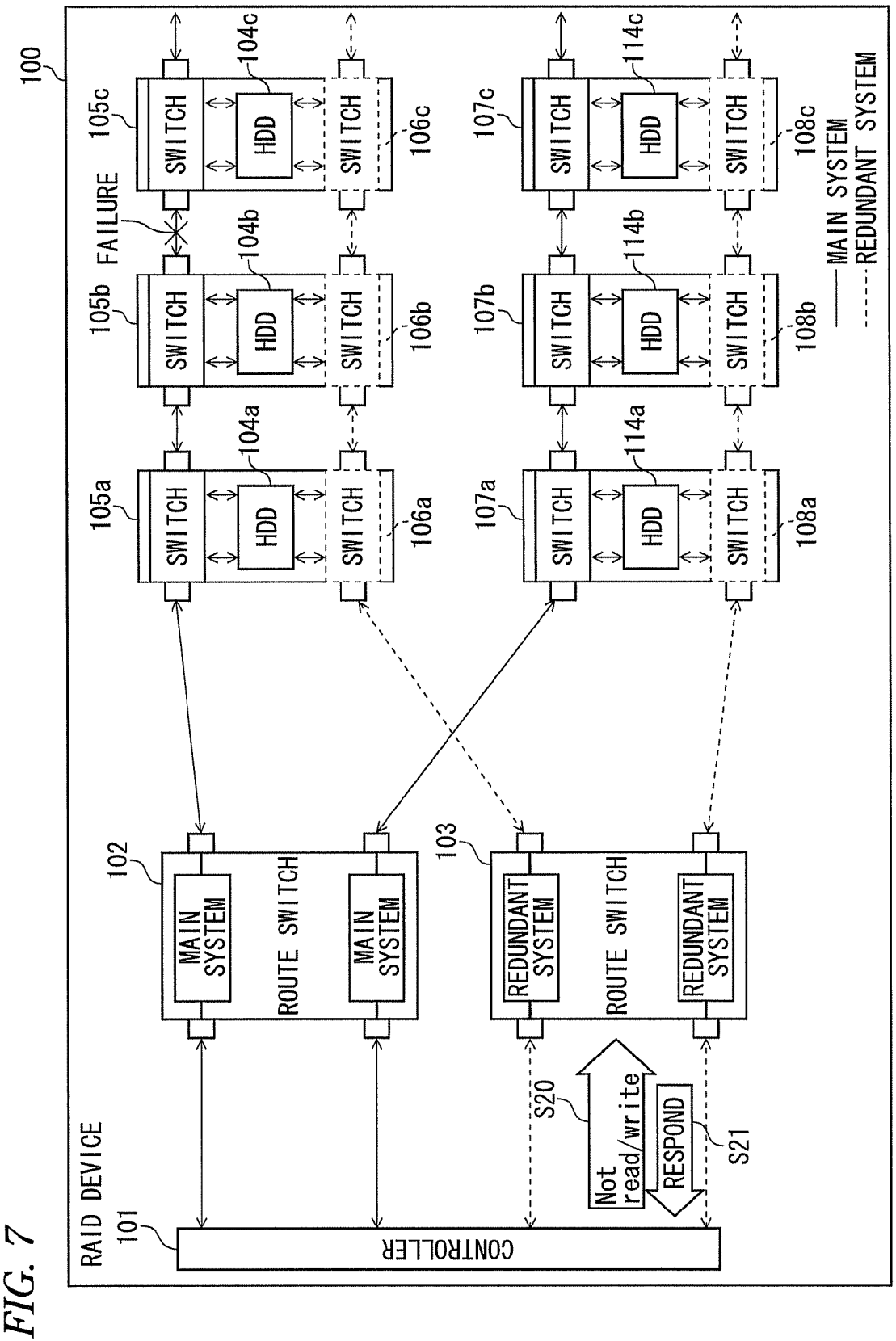
FIG. 7 is a diagram for explaining a process when a command other than a read/write command is issued.

A process executed by the route switch 103 when the controller 101 issues a command other than the read/write command will be described with reference to FIGS. 7, 2, and 4. FIG. 7 is a diagram for explaining a process when a command other than a read/write command is issued.

As illustrated in FIG. 7, the command processing unit 201a illustrated in FIG. 4 first analyzes that a command issued from the controller 101 to the route switch 103 is a command other than the read/write command (operation S20).

The power of the switches of the redundant system does not have to be turned on if the command is not a read/write command, and the power of the switches of the redundant system is not turned on. Therefore, the route switch 103 performs a dummy response to the controller 101 in relation to the received command.

Specifically, the frame creating unit 201e illustrated in FIG. 4 creates a response frame to the controller 101 based on the analysis result of the command processing unit 201a and outputs the created response frame to the interface unit (see FIG. 2) 204 (operation S21).

The switch controller 200b illustrated in FIG. 2 then transfers the response frame to the controller 101 through the crossbar 103f (see FIG. 2). The controller 101 receives the response frame through the port 103b (see FIG. 2). Therefore, the controller 101 checks the processing result to the issued command by receiving the response frame.

Meanwhile, the power of the switches 106a to 106c of the redundant system and the switches 108a to 108c of the redundant system remains off. Therefore, unnecessary power consumption in the redundant system can be reduced.

Figure 8:
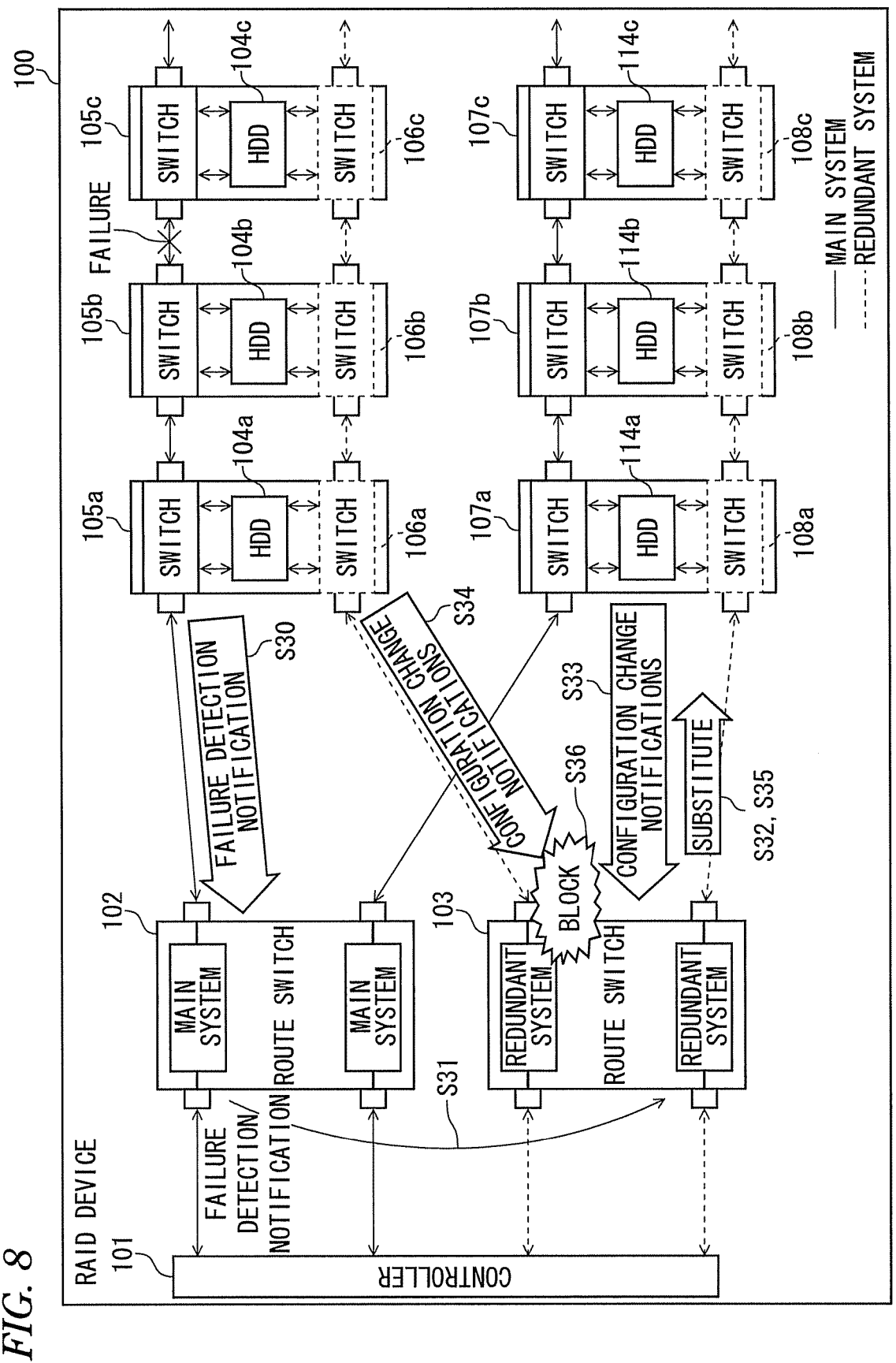
FIG. 8 is a diagram for explaining a process when a failure occurs in a main system.

A process executed by the route switch 103 when a failure such as a communication failure occurs in the main system will now be described with reference to FIG. 8 and FIGS. 2 to 4. FIG. 8 is a diagram for explaining a process when a failure occurs in the main system.

As illustrated in FIG. 8, if a communication failure occurs between the switches 105b and 105c, the switches 105b and 105c detect the communication failure. Access to the stored data from the main system is not possible when there is a communication failure.

The switch 105b then transmits a failure detection notification to the route switch 102 through the management network (operation S30). Subsequently, the processing unit 102a illustrated in FIG. 2 transfers the received failure detection notification to the route switch 103 through the management network (operation S31).

If the failure detection notification is acquired from the interface unit 204 (see FIG. 4), the failure detection notification processing unit 201g illustrated in FIG. 4 orders the ON/OFF command issuing unit 201d (see FIG. 4) to issue a power ON command of the switches 106a to 106c of the redundant system and the switches 108a to 108c of the redundant system.

The ON/OFF command issuing unit 201d illustrated in FIG. 4 then transmits the power ON command of the switches 106a to 106c of the redundant system and the switches 108a to 108c of the redundant system through the management network (operation S32).

The power of the switches 106a to 106c of the redundant system and the switches 108a to 108c of the redundant system is turned on, and configuration change notifications are generated as the power of the redundant system is turned on (operations S33 and S34).

The network information management unit 201c illustrated in FIG. 4 then acquires the configuration change notifications and updates the network information table 202a (see FIG. 3) based on the acquired configuration change notifications (operation S35).

The configuration change notification blocking unit 201b illustrated in FIG. 4 blocks the configuration change notifications to prevent the controller 101 from processing the generated configuration change notifications (operation S36).

After the network information management unit 201c finishes updating the network information table, the controller 101 switches the main system with communication failure to the redundant system, and access to the HDD 104c, which has been inaccessible due to the failure, is possible again.

(4) When HDD is Newly Installed

Figure 9:
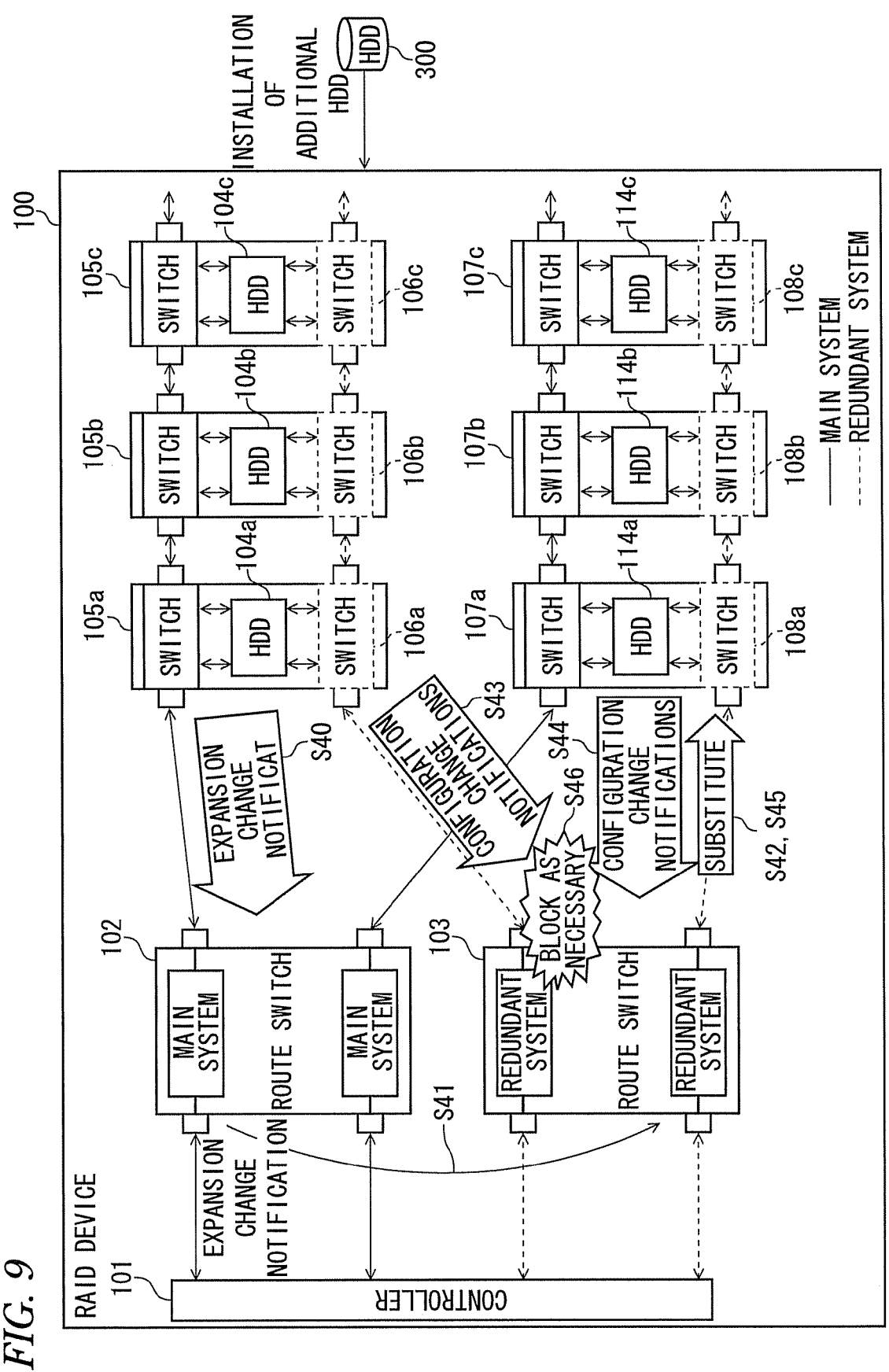
FIG. 9 is a diagram for explaining a process when an HDD is newly added.

A process executed by the route switch 103 when an HDD is added to the RAID device 100 will now be described with reference to FIG. 9 and FIGS. 2 to 4. FIG. 9 is a diagram for explaining a process when an HDD is newly added.

As illustrated in FIG. 9, if an HDD 300 is additionally installed on the RAID device 100, the main system switches transmit an expansion change notification, which is generated as an HDD is additionally installed, through the management network (operation S40).

The processing unit 102a illustrated in FIG. 2 then transfers the received expansion change notification to the route switch 103 through the management network (operation S41).

The expansion change notification processing unit 201h illustrated in FIG. 4 then orders the ON/OFF command issuing unit 201d (see FIG. 4) to issue a power ON command of the switches 106a to 106c of the redundant system and the switches 108a to 108c of the redundant system.

Subsequently, the ON/OFF command issuing unit 201d transmits the power ON command of the switches 106a to 106c of the redundant system and the switches 108a to 108c of the redundant system through the management network (operation S42).

The power of the switches 106a to 106c of the redundant system and the switches 108a to 108c of the redundant system is turned on, and configuration change notifications are generated as the power of the redundant system is turned on (operations S43 and S44).

The network information management unit 201c illustrated in FIG. 4 then acquires the configuration change notifications from the interface unit 204 (see FIG. 4) and updates the network information table 202a illustrated in FIG. 3 based on the acquired configuration change notifications (operation S45).

For example, the HDD 300 is equivalent to the storage device b illustrated in FIG. 5, and when the HDD 300 is added, data related to the storage device b is added to the network information table 202a.

The configuration change notification blocking unit 201b illustrated in FIG. 4 then blocks the generated configuration change notifications as necessary based on the network information table 212a updated by the network information management unit 201c (operation S46).

In this case, the configuration change notification blocking unit 201b transfers, without blocking, the configuration change notifications generated from the HDD 300 to the controller 101. On the other hand, the configuration change notification blocking unit 201b blocks configuration change notifications generated from devices other than the HDD 300 to prevent the notifications from being transferred to the controller 101.

Having received the configuration change notifications from the HDD 300, the controller 101 recognizes the HDD 300 and executes a process of spinning up, etc., to the HDD 300. If there is no failure, etc., in the main system, the power of the redundant system is turned off, and the configuration change notifications generated at this point are also blocked.

Figure 10:
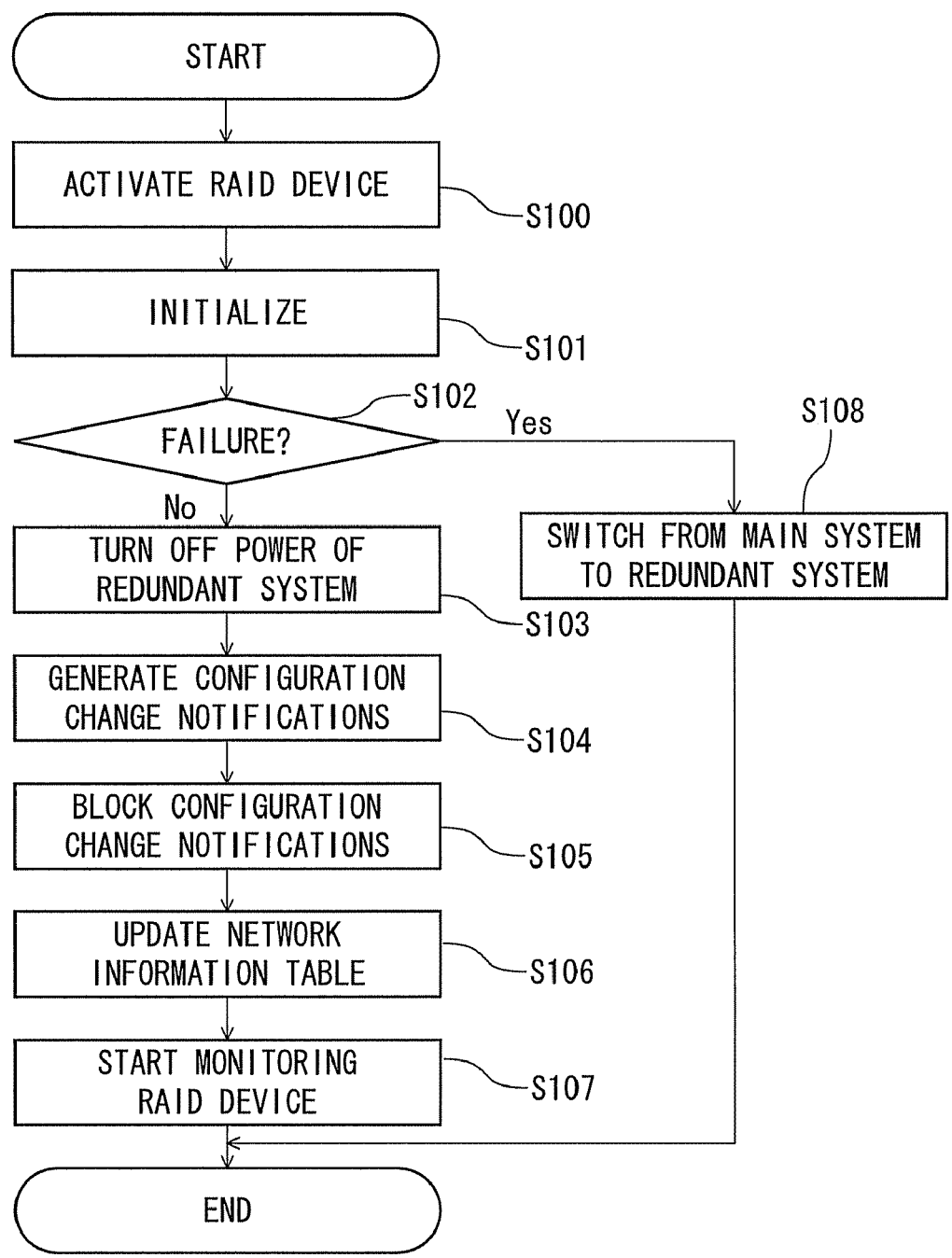
FIG. 10 is a flow chart of a procedure associated with a power-off of a redundant system.

A procedure by the route switch 103 to block the configuration change notifications generated in the redundant system after the activation of the RAID device 100 will now be described. FIG. 10 is a flow chart of a procedure associated with a power-off of the redundant system.

The power of the RAID device 100 is first turned on and activated (operation S100). When confirming that the power of the main system and the redundant system is turned on, the controller 101 initializes the network for data communication and creates the network information table 202*a* (operation S101).

If there is no communication failure in the main system (operation S102, No), the ON/OFF command issuing unit 201*d* issues a power OFF command of the switches of the redundant system through the management network (operation S103).

Subsequently, when the power of the switches of the redundant system is turned off, the HDD 104*a* and 104*b* generate configuration change notifications (operation S104). The generated configuration change notifications are transferred from the switches of the redundant system to the route switch 103 through the data communication network.

The configuration change notification blocking unit 201*b* then blocks the configuration change notifications acquired from the interface unit 204 and prevents the controller 101 from receiving the configuration change notifications (operation S105).

The network information management unit 201*c* then updates the network information table 202*a* based on the received configuration change notifications (operation S106) and starts monitoring the RAID device 100 (operation S107).

On the other hand, if there is a communication failure in operation S102 (operation S102, Yes), the controller 101 switches the communication paths in the RAID device 100 from the main system to the redundant system (operation S108).

According to the flow chart, as the configuration change notification blocking unit 201*b* blocks the configuration change notifications generated after the power of the redundant system is turned off, the controller 101 does not have to recognize the configuration change notifications generated as the power of the redundant system is turned off.

As a result, the RAID device 100 can reduce unnecessary power consumption generated in the redundant system without increasing processing resources of the controller 101.

A procedure by the route switch 103 in events generated after operation S108 will now be described with reference to FIGS. 11 to 13.

A process executed by the route switch 103 when the controller 101 issues a command to the route switch 103 will be described first. FIG. 11 is a flow chart of a procedure when a command is issued.

Figure 11:
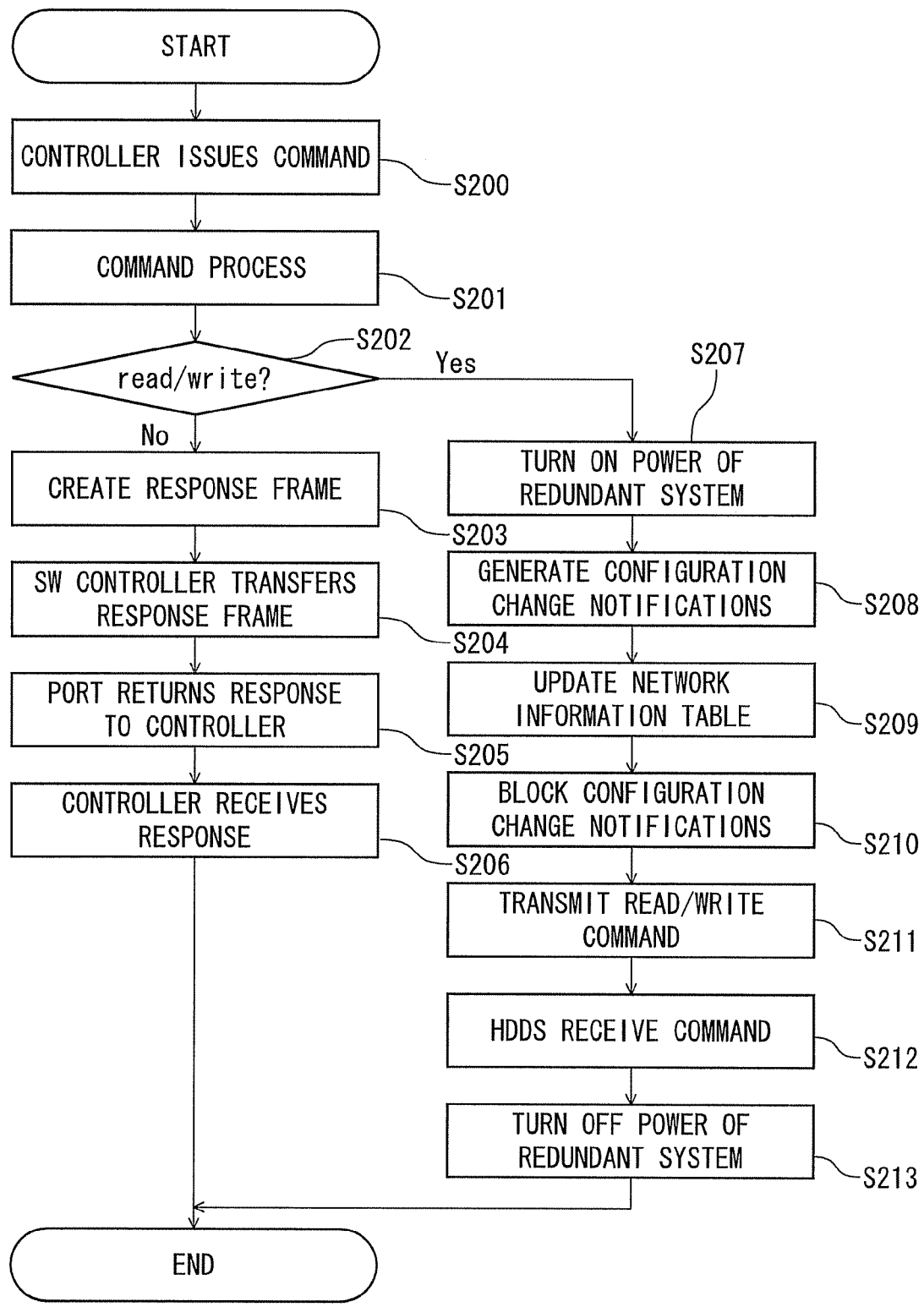
FIG. 11 is a flow chart of a procedure when a command is issued.

As illustrated in FIG. 11, the controller 101 first issues a command to the route switch 103 (operation S200), and the command processing unit 201*a* analyzes the command issued from the controller 101 (operation S201).

If the analysis result of the command processing unit 201*a* does not indicate a read/write command (operation S202, No), the frame creating unit 201*e* creates a response frame to the controller 101 (operation S203).

The interface unit 204 outputs the response frame created by the frame creating unit 201*e*. The switch controller 200*b* then transfers the outputted response frame to the crossbar 103*f* (operation S204).

The port 103*b* transfers the response frame to the controller 101 (operation S205). The controller 101 then receives the response frame from the port 103*b* (operation S206).

On the other hand, if the analysis result of the command processing unit 201*a* indicates a read/write command (operation S202, Yes), the ON/OFF command issuing unit 201*d* issues a power ON command of the switches of the redundant system through the management network.

After the power of the switches of the redundant system is turned on (operation S207), the HDD 104*a* to 104*c* and the HDD 114*a* to 114*c* generate configuration change notifications generated as the power of the redundant system is turned on (operation S208).

The network information management unit 201*c* then acquires the configuration change notifications from the interface unit 204 and updates the network information table 202*a* based on the acquired configuration change notifications (operation S209).

The configuration change notification blocking unit 201*b* then blocks the configuration change notifications to prevent the controller 101 from processing the generated configuration change notifications (operation S210).

A predetermined time after the ON/OFF command issuing unit 201*d* issued the power ON command, the command holding unit 201*f* transmits the read/write command to the HDD (operation S211).

The HDD receive the read/write command (operation S212), and if there is no communication failure, etc., in the main system, the power of the redundant system is turned off (operation S213).

In this way, according to the flow chart, the route switch 103 issues a power ON command of the redundant system according to the type of command issued by the controller 101. Therefore, the power of the redundant system can be turned on/off as necessary, and the power consumption of the redundant system can be reduced.

A process executed by the route switch 102 when a failure, such as a communication failure, occurs in the main system will now be described. FIG. 12 is a flow chart of a procedure when a failure occurs in the main system.

Figure 12:
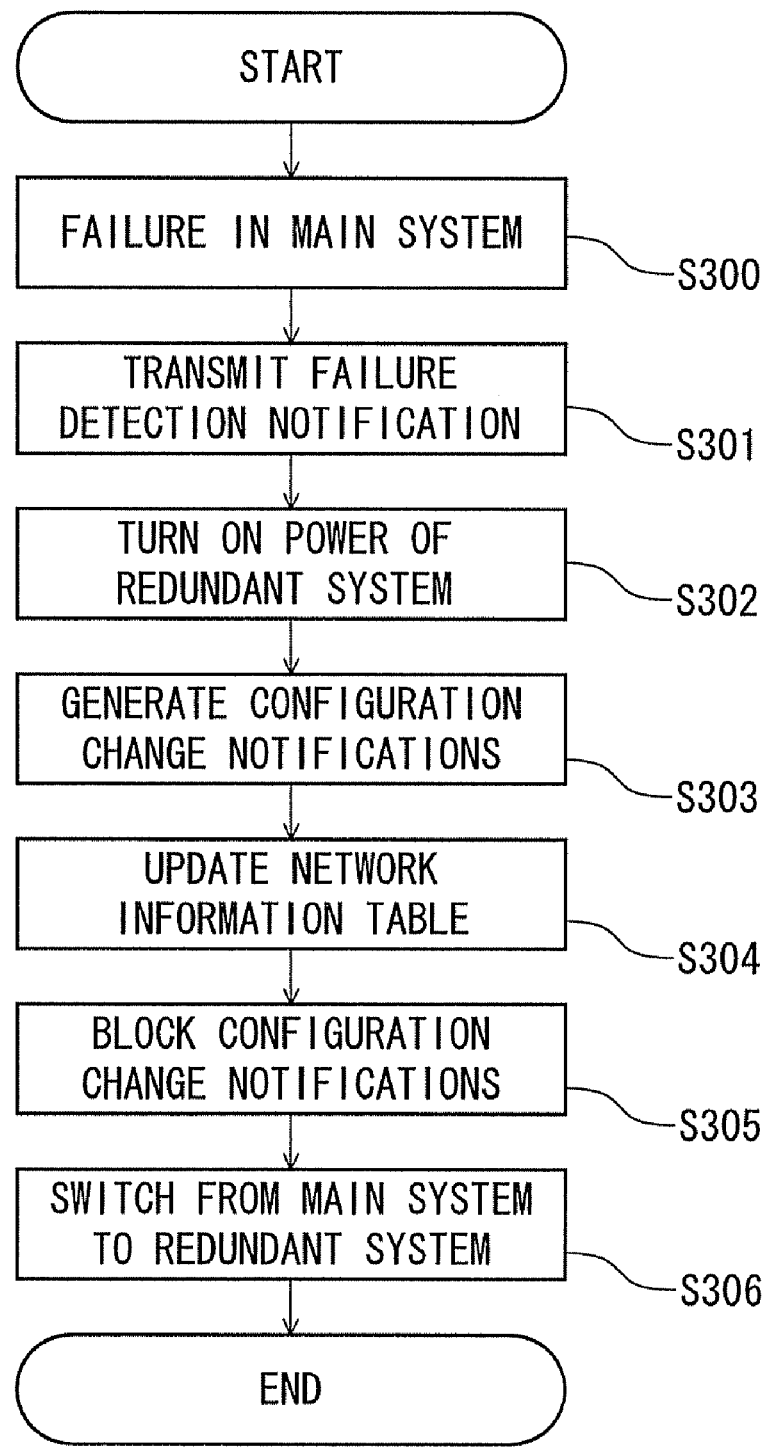
FIG. 12 is a flow chart of a procedure when a failure occurs in a main system.
Figure 13:
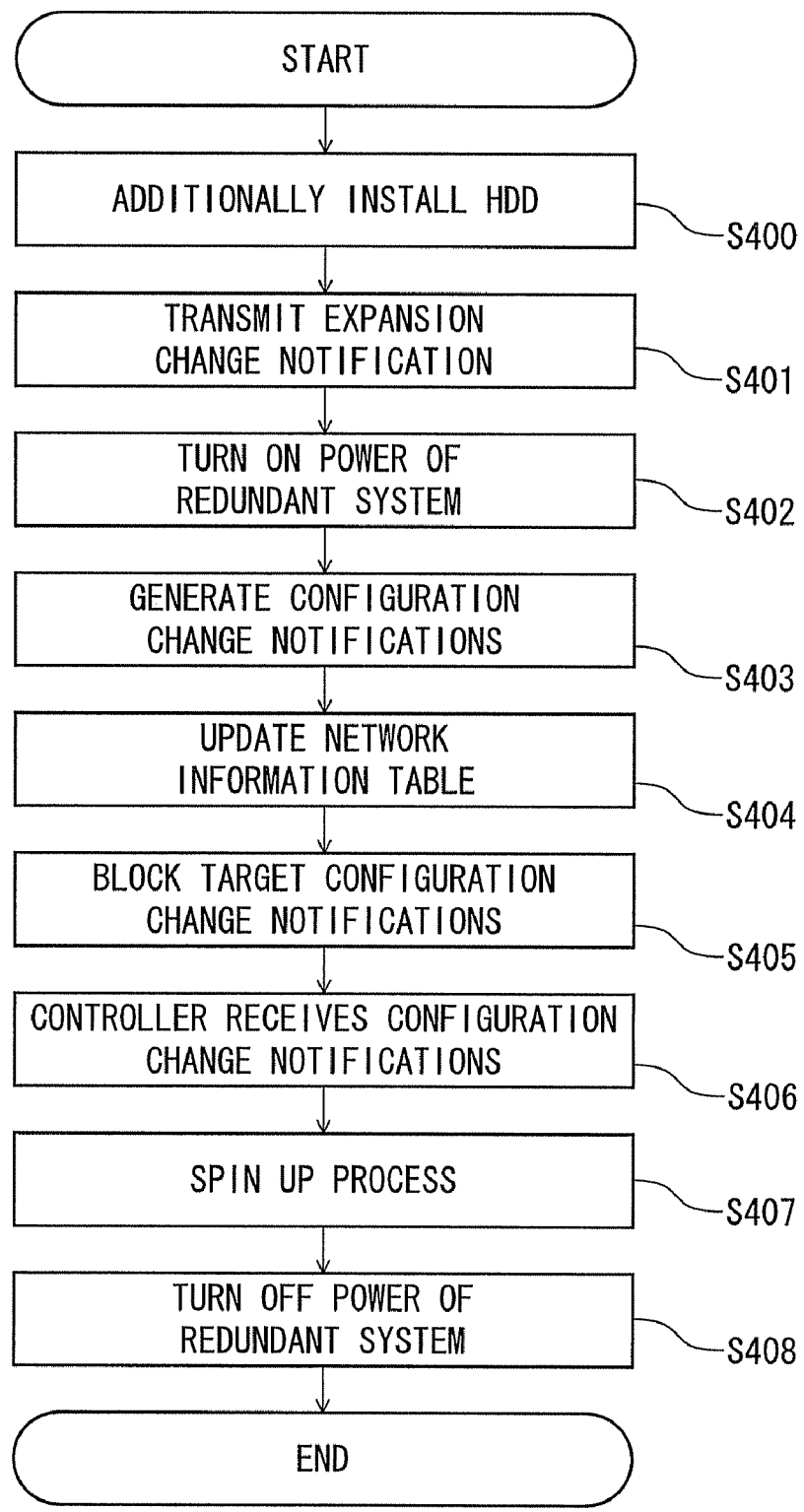
FIG. 13 is a flow chart of a procedure associated with an additional installation of an HDD.
Figure 14:
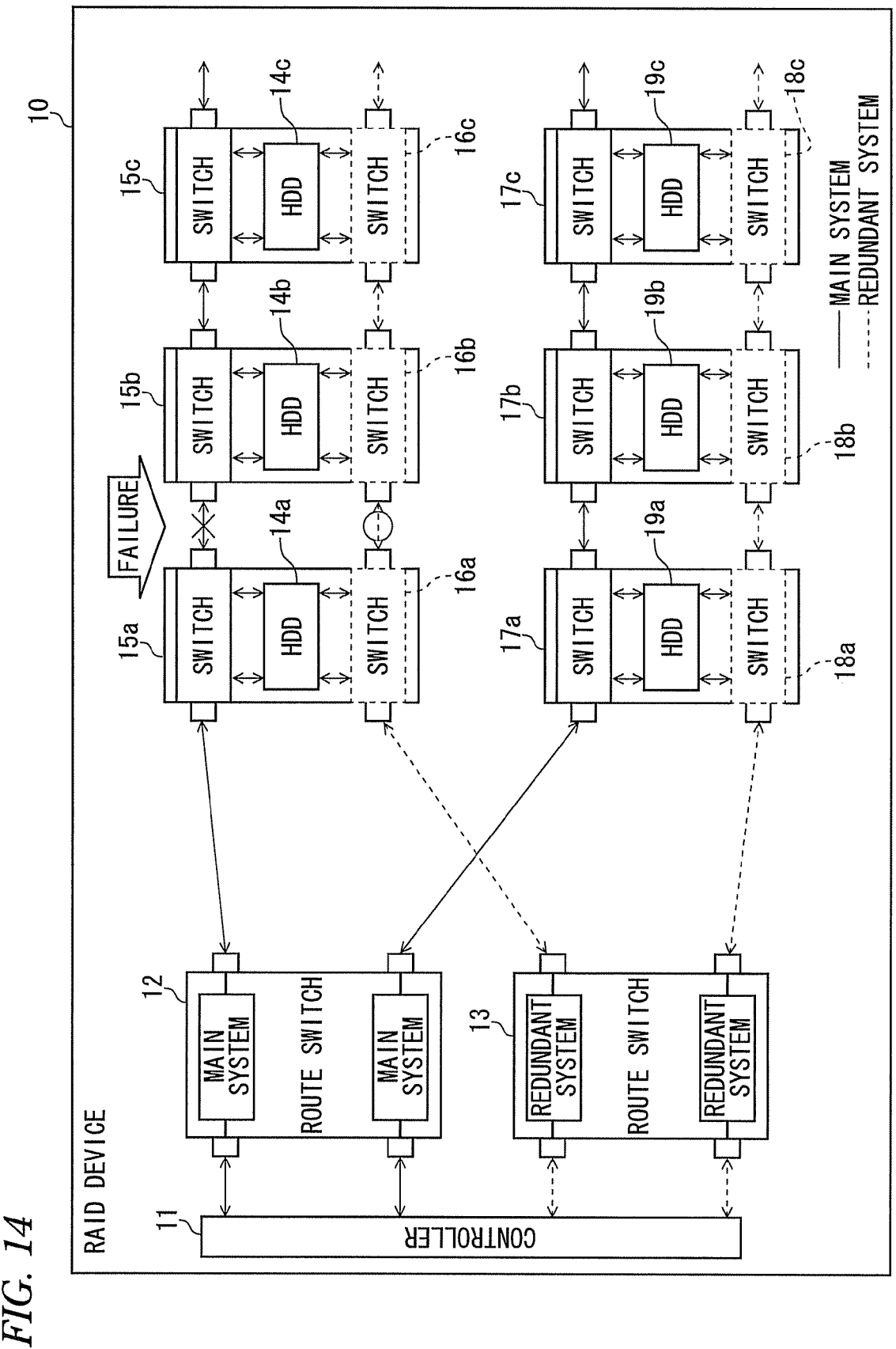
FIG. 14 is a diagram for explaining a RAID device.

As illustrated in FIG. 12, a communication failure occurs in the main system (operation S300), and the switches of the main system transmit a failure detection notification to the route switch 102 through the management network. The processing unit 102*a* then transmits the received failure detection notification to the route switch 103 through the management network (operation S301).

Based on an order from the failure detection notification processing unit 201*g*, the ON/OFF command issuing unit 201*d* issues a power ON command of the switches of the redundant system, and the power of the switches of the redundant system is turned on (operation S302).

Configuration change notifications are generated as the power of the redundant system is turned on (operation S303), and the network information management unit 201*c* acquires the configuration change notifications from the interface unit 204 and updates the network information table 202*a* based on the acquired configuration change notifications (operation S304).

The configuration change notification blocking unit 201*b* blocks the configuration change notifications to prevent the controller 101 from processing the generated configuration change notifications (operation S305).

After the network information management unit 201*c* completes updating the network information table 202*a*, the controller 101 switches the main system with failure to the redundant system (operation S306), and access to the HDD 104*c*, which has been inaccessible due to the failure, is possible again.

According to the flow chart, the data communication paths are switched from the main system with communication failure to the redundant system. In that case, the controller 101 does not recognize the configuration change notifications generated as the power of the redundant system is turned on, and access to the HDD 104*c*, which has been inaccessible due to the communication failure, is possible again.

A process executed by the route switch 102 when an HDD is newly added will now be described. FIG. 13 is a flow chart of a procedure associated with an additional installation of an HDD.

If the HDD 300 is additionally installed on the RAID device 100 (operation S400), the switches of the main system transmit an expansion change notification associated with the additional installation of the HDD 300 through the management network, and the processing unit 102*a* transfers the received expansion change notification to the route switch 103 through the management network (operation S401).

Based on an order from the expansion change notification processing unit 201*h*, the ON/OFF command issuing unit 201*d* issues a power ON command of the switches of the redundant system to turn on the power of the switches 106*a* to 106*c* of the redundant system and the switches 108*a* to 108*c* of the redundant system (operation S402).

When the power of the switches of the redundant system is turned on, configuration change notifications are generated as the power of the redundant system is turned on (operation S403).

The network information management unit 201*c* then acquires the configuration change notifications from the interface unit 204 and updates the network information table 202*a* based on the acquired configuration change notifications (operation S404).

The configuration change notification blocking unit 201*b* blocks the generated configuration change notifications as necessary based on the network information table 202*a* updated by the network information management unit 201*c* (operation S405).

The controller 101 then receives a configuration change notification corresponding to the additionally installed HDD 300 (operation S406) and executes a process such as spinning up (operation S407). If there is no communication failure, etc., in the main system, the power of the redundant system is turned off (operation S408).

According to the flow chart, the controller 101 only has to recognize the configuration change notification generated from the HDD 300, and the resources of the processes executed by the controller 101 can be reduced.

As described, as the route switch 103 according to an embodiment blocks the configuration change notifications generated as the power of the redundant system is turned off immediately after the activation of the RAID device 100, the controller 101 does not have to recognize the configuration change notifications.

As a result, the controller 101 does not execute a recognition process as the power of the redundant system is turned off, and unnecessary power consumption in the redundant system can be reduced.

The HDD described in an embodiment are not limited to the hard disk devices, but may be other storage devices such as thermo magnetic disk devices and semiconductor non-volatile memories.

According to an embodiment of a communication control apparatus disclosed in the present application, unnecessary power consumption in the redundant system can be reduced without increasing the processing resources of the controller in the RAID device.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A communication control apparatus in a RAID device including redundant communication paths to storage devices, the apparatus comprising:
    a blocking unit that blocks configuration change notifications outputted from the storage devices to a control apparatus, which controls access to the storage devices, when a power of a communication relay device arranged on the redundant paths connecting the storage devices and the control apparatus is turned off.

2. The communication control apparatus according to claim 1, comprising:
    a substituting unit that substitutes for the control apparatus to control access to the storage devices after the power of the communication relay device is turned off.

3. The communication control apparatus according to claim 2, the substituting unit comprising:
    a storage unit that stores power information indicating whether a power of the storage devices is turned on; and
    a power control unit that controls the power of the communication relay device,
    wherein the substituting unit updates the power information based on a process of the power control unit.

4. The communication control apparatus according to claim 2, wherein
    when the control apparatus issues a read/write command to the storage devices, the substituting unit issues a command for turning on the power of the communication relay device arranged on the redundant paths and blocks the configuration change notifications outputted from the storage devices to the control apparatus as the power of the communication relay device is turned on.

5. The communication control apparatus according to claim 2, wherein when the control apparatus issues a command other than the read/write command to the storage devices, the substituting unit responds to the control apparatus in place of the storage devices.

6. The communication control apparatus according to claim 2, wherein when the substituting unit receives information indicating that there is a communication failure in a communication path different from the redundant paths in the RAID device, the substituting unit issues a power ON command for turning on the power of the communication relay device arranged on the redundant paths and blocks the configuration change notifications outputted from the storage devices to the control apparatus as the power of the communication relay device is turned on.

7. The communication control apparatus according to claim 2, wherein when the substituting unit receives a notification indicating that a storage device is additionally installed on the RAID device, the substituting unit issues a power ON command for turning on the power of the communication relay device arranged on the redundant paths and blocks configuration change notifications, among the configuration change notifications generated from the storage devices, outputted from storage devices other than the additionally installed storage device to the control apparatus as the power of the communication relay device is turned on.

8. The communication control apparatus according to claim 7, wherein the substituting unit transfers a configuration change notification, which includes information indicating that the storage device is additionally installed, to the control apparatus.

9. A storage system including storage devices that store data and a control apparatus that controls access to the storage devices, the storage system comprising:

a communication relay device and a communication control apparatus arranged on redundant communication paths connecting the storage devices and the control apparatus, and the communication control apparatus including:
a blocking unit that blocks configuration change notifications outputted from the storage devices to the control apparatus when a power of the communication relay device arranged on the redundant paths is turned off.

10. The storage system according to claim 9, the communication control apparatus comprising:

a substituting unit that substitutes for the control apparatus to control access to the storage devices after the power of the communication relay device is turned off.

11. The storage system according to claim 10, the substituting unit comprising:

a storage unit that stores power information indicating whether a power of the storage devices is turned on; and a power control unit that controls the power of the communication relay device, and wherein the substituting unit updates the power information based on a process of the power control unit.

12. The storage system according to claim 10, wherein when the control apparatus issues a read/write command to the storage devices, the substituting unit issues a command for turning on the power of the communication relay device arranged on the redundant paths and blocks the configuration change notifications outputted from the storage devices to the control apparatus as the power of the communication relay device is turned on.

13. The storage system according to claim 10, wherein when the control apparatus issues a command other than the read/write command to the storage devices, the substituting unit responds to the control apparatus in place of the storage devices.

14. The storage system according to claim 10, wherein when the substituting unit receives information indicating that there is a communication failure in a communication path different from the redundant paths, the substituting unit issues a power ON command for turning on the power of the communication relay device arranged on the redundant paths and blocks the configuration change notifications outputted from the storage devices to the control apparatus as the power of the communication relay device is turned on.

15. The storage system according to claim 10, wherein when the substituting unit receives a notification indicating that the storage device is additionally installed, the substituting unit issues a power ON command for turning on the power of the communication relay device arranged on the redundant paths and blocks configuration change notifications outputted from the storage devices to the control apparatus as the power of the communication relay device is turned on.

16. The storage system according to claim 15, wherein the substituting unit transfers a configuration change notification, which includes information indicating that the storage device is additionally installed, to the control apparatus.

17. A communication control method of a communication control apparatus, the method comprising:

acquiring configuration change notifications outputted from storage devices to a control apparatus, which controls access to the storage devices, when a power of a communication relay device arranged on redundant paths connecting the storage devices and the control apparatus is turned off in a RAID device including the redundant communication paths to the storage devices; and blocking to transfer the configuration change notifications acquired in the acquisition operation to the control apparatus.

18. The communication control method according to claim 17, comprising:

substituting for the control apparatus to control access to the storage devices after the power of the communication relay device is turned off.

19. The communication control method according to claim 18, comprising:

storing power information indicating whether a power of the storage devices is turned on; and controlling power of the communication relay device, and wherein the power information is updated based on a process of the controlling power control of the communication relay device.

20. A communication control method, comprising:

determining that a command received is a change of configuration notification based on analysis of the command; and selectively blocking the notification when detecting that a power relative to redundant paths is off.

* * * * *